United States Patent
Ji (10) Patent No.: US 11,455,186 B2
(45) Date of Patent: Sep. 27, 2022

(54) CONTROLLER AND MEMORY SYSTEM HAVING THE SAME

(71) Applicant: SK hynix Inc., Gyeonggi-do (KR)

(72) Inventor: Seung Gu Ji, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 353 days.

(21) Appl. No.: 16/727,417

(22) Filed: Dec. 26, 2019

(65) Prior Publication Data

US 2020/0356407 A1  Nov. 12, 2020

(30) Foreign Application Priority Data

May 9, 2019  (KR) .................. 10-2019-0054502

(51) Int. Cl.
| | |
|---|---|
| *G06F 9/48* | (2006.01) |
| *G06F 12/02* | (2006.01) |
| *G06F 13/16* | (2006.01) |
| *G06F 9/54* | (2006.01) |
| *G06F 9/4401* | (2018.01) |
| *G06F 11/30* | (2006.01) |

(52) U.S. Cl.
CPC .......... *G06F 9/4881* (2013.01); *G06F 9/4418* (2013.01); *G06F 9/546* (2013.01); *G06F 11/3041* (2013.01); *G06F 12/0292* (2013.01); *G06F 13/1668* (2013.01); *G06F 2212/7201* (2013.01)

(58) Field of Classification Search
None
See application file for complete search history.

(56) References Cited

U.S. PATENT DOCUMENTS

| | | | | |
|---|---|---|---|---|
| 2006/0053246 A1* | 3/2006 | Lee | ............ | G06F 9/4403 711/100 |
| 2007/0258295 A1* | 11/2007 | Kagan | ........... | G11C 7/22 365/193 |
| 2012/0167100 A1* | 6/2012 | Li | ............ | G11C 16/22 710/5 |
| 2013/0219104 A1* | 8/2013 | Burd | ............ | G06F 3/0611 711/102 |

FOREIGN PATENT DOCUMENTS

| | | |
|---|---|---|
| KR | 10-2016-0131268 | 11/2016 |
| KR | 10-2017-0033643 | 3/2017 |

* cited by examiner

*Primary Examiner* — Stephanie Wu
(74) *Attorney, Agent, or Firm* — IP & T Group LLP (57) ABSTRACT

A controller includes: a command queue scheduler for queuing normal commands, and providing a priority order to a suspend command, when the suspend command is input; a data input/output component for outputting data in response to a data output signal output the command queue scheduler, and stopping the output of the data in response to a data output stop signal; and a data monitor for dividing data input to the data input/output component into a plurality of data groups, and monitoring information of a data group including data currently output from the data input/output component. The data input/output component outputs data up to the currently output data included in the data group and then stops the output of the data, in response to the data output stop signal. The command queue scheduler outputs the suspend command, when the output of the data group is stopped.

21 Claims, 9 Drawing Sheets

CONTROLLER AND MEMORY SYSTEM HAVING THE SAME

CROSS-REFERENCE TO RELATED APPLICATION

The present application claims priority under 35 U.S.C. § 119(a) to Korean patent application number 10-2019-0054502, filed on May 9, 2019, which is incorporated herein by reference in its entirety.

BACKGROUND

Field of Invention

The present disclosure generally relates to a controller and a memory system having the same, and more particularly, to a controller configured to perform a suspend operation in response to a suspend command, and a memory system having the controller.

Description of Related Art

A memory system may include a memory device and a controller.

The memory device may include a plurality of dies capable of storing data. Memory cells included in the dies may be implemented as volatile memory cells in which stored data disappears when the supply of power is interrupted, or be implemented as nonvolatile memory cells in which stored data is retained even when the supply of power is interrupted.

The controller may control data communication between a host and the memory device. For example, the controller may control the memory device in response to a request from the host. Also, the controller may perform a background operation without any request from the host so as to improve the performance of the memory system.

The host may communicate with the memory device through the controller by using an interface protocol such as Peripheral Component Interconnect-Express (PCI-e or PCIe), Advanced Technology Attachment (ATA), Serial ATA (SATA), Parallel ATA (PATA), or Serial Attached SCSI (SAS). Alternatively, any of various other interface protocols, such as a Universal Serial Bus (USB), a Multi-Media Card (MMC), an Enhanced Small Disk Interface (ESDI), or Integrated Drive Electronics (IDE) may be used.

SUMMARY

Embodiments provide a controller capable of preventing execution delay of a suspend command and a memory system having the controller.

In accordance with an aspect of the present disclosure, there is provided a controller including: a command queue scheduler configured to queue normal commands, and provide a suspend command with a higher priority than the normal commands, when the suspend command is input; a data input/output component configured to output multiple data items in response to a data output signal from the command queue scheduler, and stop the output of the multiple data items in response to a data output stop signal from the command queue scheduler; and a data monitor configured to divide plural items of input data input to the data input/output component into a plurality of data groups, and monitor information of a current data group including data that is currently output from the data input/output component, wherein the data input/output component outputs preceding data and the currently output data in the current data group and stops the output of next data, in response to the data output stop signal, wherein the command queue scheduler outputs the suspend command, when the output of the current data group is stopped.

In accordance with another aspect of the present disclosure, there is provided a memory system including: first and second dies coupled to the same channel; a processor configured to output a first command or a second command having a higher priority than that of the first command, in response to a request received from a host; and a flash interface layer configured to output data to the first die in response to the first command, wherein the flash interface layer: divides input data into a plurality of data groups; when the second command is input, outputs preceding data and currently output data in a current data group and then outputs the second command to the second die; and when execution of the second command ends, outputs, to the first die, data in a next data group of the current data group that has been completely output.

In accordance with another aspect of the present disclosure, there is provided a memory system including: first and second dies; and a controller including: a processor suitable for receiving a request from a host, and generating a first command for a first die and a second command for a second die, the second command having a higher priority than that of the first command, in response to the request; and a flash interface layer coupled to the first and second dies through a channel, and suitable for receiving a plurality of data groups corresponding to the first command, each of the plurality of data groups including plural data items, providing some data groups among the plurality of data groups to the first die, suspending providing remaining data groups among the plurality of data groups to the first die when the second command is received, and providing the remaining data groups to the first die when the second command is executed.

BRIEF DESCRIPTION OF THE DRAWINGS

Various embodiments are described more fully below with reference to the accompanying drawings; however, the present invention may be embodied in different forms and thus is not limited to the embodiments set forth herein. Rather, these embodiments are provided so that this disclosure is thorough and complete and fully conveys the scope of the embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout. Also, throughout the specification, reference to "an embodiment," "another embodiment" or the like is not necessarily to only one embodiment, and different references to any such phrase are not necessarily to the same embodiments).

DETAILED DESCRIPTION

With respect to the present disclosure, advantages, features and methods for achieving them will become more apparent in light of the description of the following embodiments taken in conjunction with the drawings. The present invention may, however, be embodied in different forms and should not be construed as being limited to the embodiments set forth herein. Rather, these embodiments are provided to describe the present disclosure in detail to the extent that those skilled in the art to which the disclosure pertains may easily practice the present invention.

Throughout the specification, when an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include one or more other components instead of excluding other components unless stated otherwise.

Figure 1:
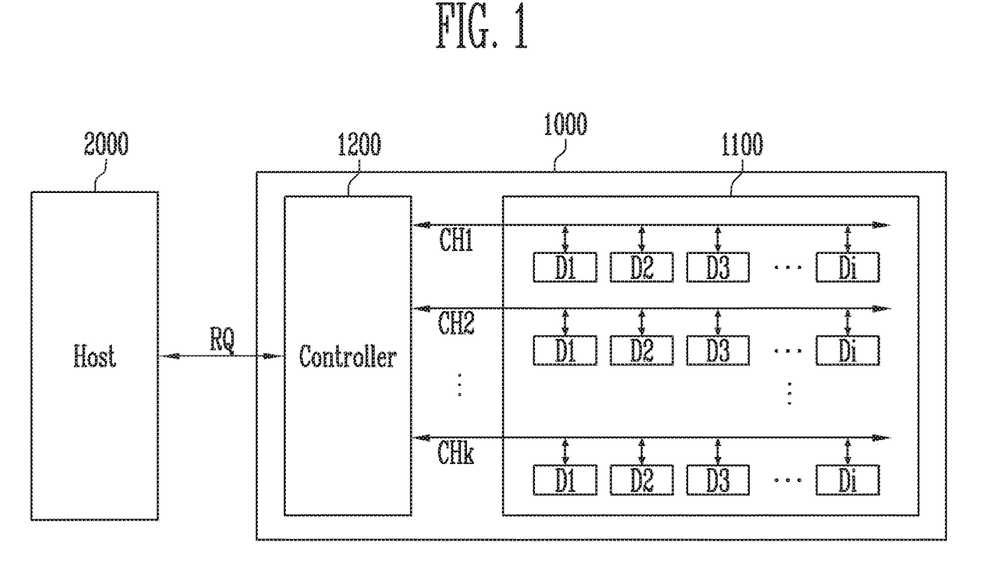
FIG. 1 is a diagram illustrating a memory system in accordance with an embodiment of the present disclosure.

FIG. 1 is a diagram illustrating a memory system in accordance with an embodiment of the present disclosure.

Referring to FIG. 1, the memory system 1000 may include a memory device 1100 configured to store data and a controller 1200 configured to control the memory device 1100.

The memory device 1100 may include a plurality of dies D1 to Di (where i is a positive integer greater than 1). The dies D1 to D1 may be implemented with a volatile memory device in which stored data disappears when the supply of power is interrupted or a nonvolatile memory device in which stored data is retained even when the supply of power is interrupted. In the following embodiments, the memory system including the dies D1 to D1 implemented with the nonvolatile memory device is described as an example. The nonvolatile memory device may be a NAND flash memory device.

The memory device 1100 may communicate with the controller 1200 through a plurality of channels CH1 to CHk (where k is a positive integer greater than 1). For example, the dies D1 to D1 in the memory device 1100 may receive a command, an address, data, and the like from the controller 1200 through the channels CH1 to CHk, and output data to the controller 1200.

The controller 1200 may control the memory device 1100 in response to a request received from a host 2000, and output data read from the memory device 1100 to the host 2000. For example, when the controller 1200 receives a program request and data from the host 2000, the controller 1200 may store the received data in the memory device 1100. When the controller 1200 receives a read request and a logical address from the host 2000, the controller 1200 may perform a read operation according to a physical address mapped to the logical address, and output read data to the host 2000.

The controller 1200 may perform a background operation capable of managing the memory device 1100 without any request from the host 2000. For example, the controller 1200 may perform a function including garbage collection, wear leveling, and the like. In addition, the controller 1200 may perform various functions for efficiently managing the memory device 1100.

Also, when the controller 1200 receives a suspend request from the host 2000, the controller 1200 may generate a suspend command corresponding to the suspend request. That is, the suspend command may have priority over a normal command. For example, the suspend command may be a read command, and the normal command may be a program command or erase command. When a selected channel is free, the controller may immediately transmit the suspend command to a selected die through the selected channel.

When the selected channel is busy, the controller 1200 may queue commands such that the suspend command can be executed next after a command currently being executed in the selected channel. When the controller 1200 is transmitting program data to another die through the selected channel, the controller 1200 may transmit the program data to that die including all data groups of the program data currently being transmitted at the time the suspend command is received from the host, and transmit the suspend command to the selected die.

When the suspend command is transmitted to the selected die, the controller 1200 may re-transmit a program command, a physical address, and the program data to the other die on which the program data transmission operation is stopped. The controller 1200 does not re-transmit the data that has already been transmitted, but may transmit data that is not yet transmitted. To this end, in a program operation, the controller 1200 may divide program data into a plurality of groups, and determine in which data group data being currently transmitted is included. Accordingly, the memory system 1000 may prevent suspend command execution delay of a selected die, and reduce a resume operation time of another die.

The host 2000 may communicate with the memory system 1000 by using an interface protocol such as Peripheral Component Interconnect-Express (PCI-e or PCIe), Advanced Technology Attachment (ATA), Serial ATA (SATA), Parallel ATA (PATA), Serial Attached SCSI (SAS), or Non-Volatile Memory Express (NVMe). The interface protocol is not limited to the above-described examples; alternatively the host 2000 may communicate with the memory system 1000 through any of various other protocols such as a Universal Serial Bus (USB), a Multi-Media Card (MMC), an Enhanced Small Disk Interface (ESDI), and Integrated Drive Electronics (IDE).

Figure 2:
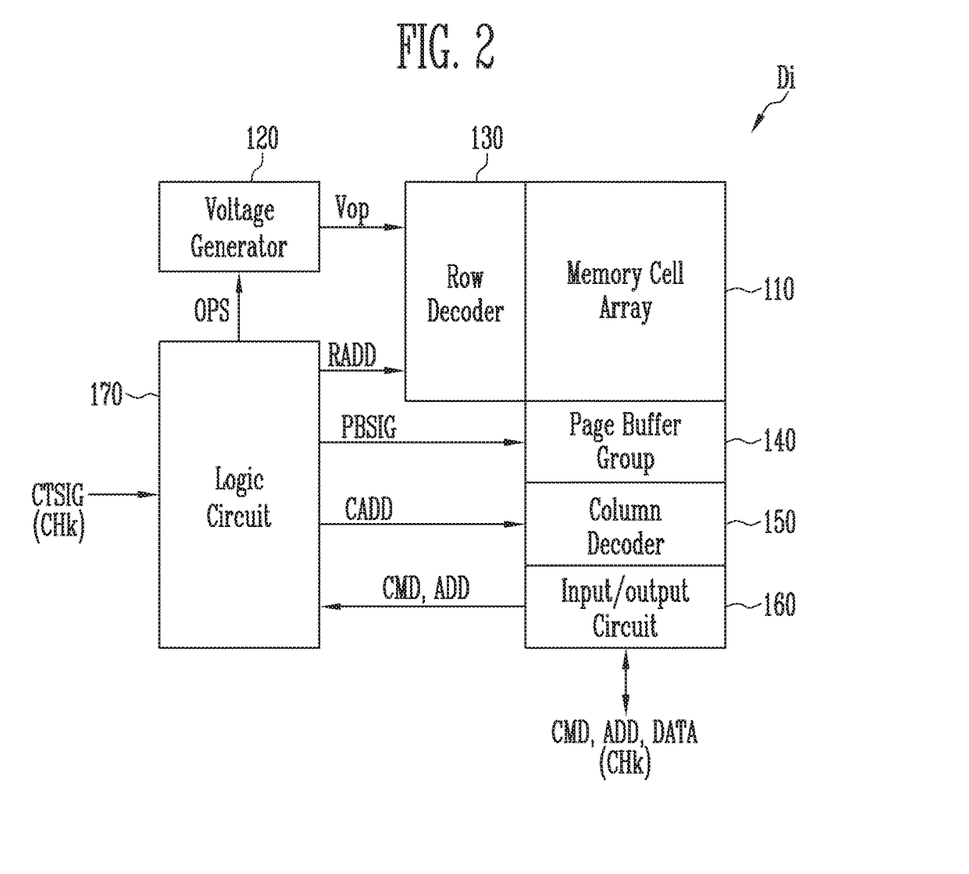
FIG. 2 is a diagram illustrating a die shown in FIG. 1.

FIG. 2 is a diagram illustrating a representative die D1 of the dies shown in FIG. 1.

Referring to FIG. 2, the die D1 may include a memory cell array 110 configured to store data, a peripheral circuit configured to perform a program, read or erase operation, and a logic circuit 170 configured to control the peripheral circuit.

The memory cell array 110 may include a plurality of memory blocks in which data is stored. Each of the memory blocks may include a plurality of memory cells, and the memory cells may be implemented in a two-dimensional structure in which the memory cells are arranged in parallel to a substrate or a three-dimensional structure in which the memory cells are stacked vertically to a substrate.

The peripheral circuit may include a voltage generator 120, a row decoder 130, a page buffer group 140, a column decoder 150, and an input and output (input/output) circuit 160.

The voltage generator 120 may generate and output operating voltages Vop necessary for various operations in response to an operation signal OPS. For example, the voltage generator 120 may generate and output a program voltage, a verify voltage, a read voltage, a pass voltage, an erase voltage, and the like.

The row decoder 130 may select one memory block among the memory blocks in the memory cell array 110 according to a row address RADD, and transmit operating voltages Vop to the selected memory block.

The page buffer group 140 may be coupled to the memory cell array 110 through bit lines, and include a plurality of page buffers coupled to the bit lines. The plurality of page buffers may temporarily store data in a program or read operation in response to a page buffer control signal PBSIG. To this end, the page buffers may include a plurality of latches for temporarily storing data. For example, data received through the channel CHk in the program operation may be temporarily stored in the page buffers and then programmed. Data read from the memory cell array 110 in the read operation may be temporarily stored in the page buffers and then output.

The column decoder 150 may sequentially transmit data received from the input/output circuit 160 to the page buffers included in the page buffer group 140 according to a column address CADD, or sequentially transmit data received from the page buffers to the input/output circuit 160.

The input/output circuit 160 may be coupled to the controller 1200 through input/output lines of the channel CHk, and input and output a command CMD, an address ADD, and data DATA through the input/output lines. For example, the input/output circuit 160 may transmit the command CMD and the address ADD, which are received from the controller 1200, to the logic circuit 170, and transmit the data DATA received from the controller 1200 to the column decoder 150. Also, the input/output circuit 160 may output data read from the memory cell array 110 to the controller 1200 through the input/output lines of the channel CHk.

The logic circuit 170 may output operation signals OPS, a row address RADD, page buffer control signals PBSIG, and a column address CADD, in response to a control signal CTSIG received from the controller 1200 through the channel CHk and the command CMD and the address ADD, which are received from the input/output circuit 160.

Figure 3:
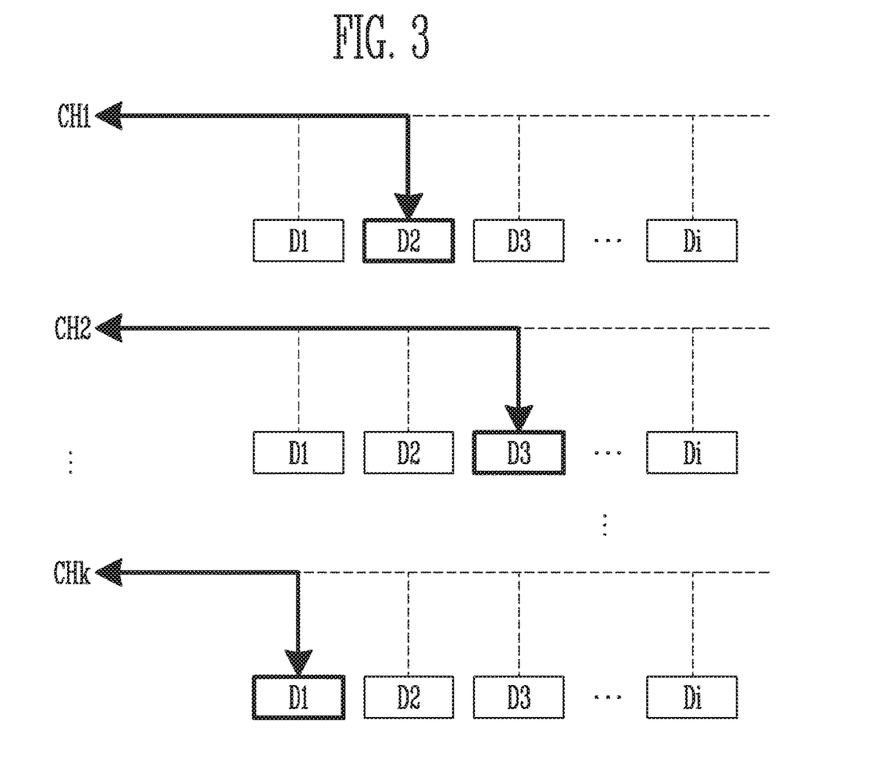
FIG. 3 is a diagram illustrating a command execution method in a multi-channel scheme.

FIG. 3 is a diagram illustrating a command execution method in a multi-channel scheme.

Referring to FIG. 3, a plurality of dies D1 to D1 may be coupled to each of a plurality of channels CH1 to CHk in the multi-channel scheme. For example, first to ith dies D1 to D1 may be coupled to a first channel CH1, first to ith dies D1 to D1 may be coupled to a second channel CH2, and first to ith dies D1 to D1 may be coupled to a kth channel CHk. First to ith dies D1 to D1 coupled to different channels may be physically different dies. Dies coupled to the same channel cannot be simultaneously selected, and dies coupled to different channels can be simultaneously selected.

For example, when a second die D2 among first to ith dies D1 to Di coupled to the first channel CH1 communicates with the controller 1200, the first and third to ith dies D1 and D3 to D1 cannot communicate with the controller 1200. However, when the second die D2 among the first to ith dies D1 to D1 coupled to the first channel CH1 communicates with the controller 1200, a third die D3 coupled to the second channel CH2 and a first die D1 coupled to the kth channel CHk can simultaneously communicate with the controller 1200. A die selected in each channel is an example for describing the present disclosure, and therefore, dies simultaneously selected in different channels may vary depending on a command and an address.

Figure 4:
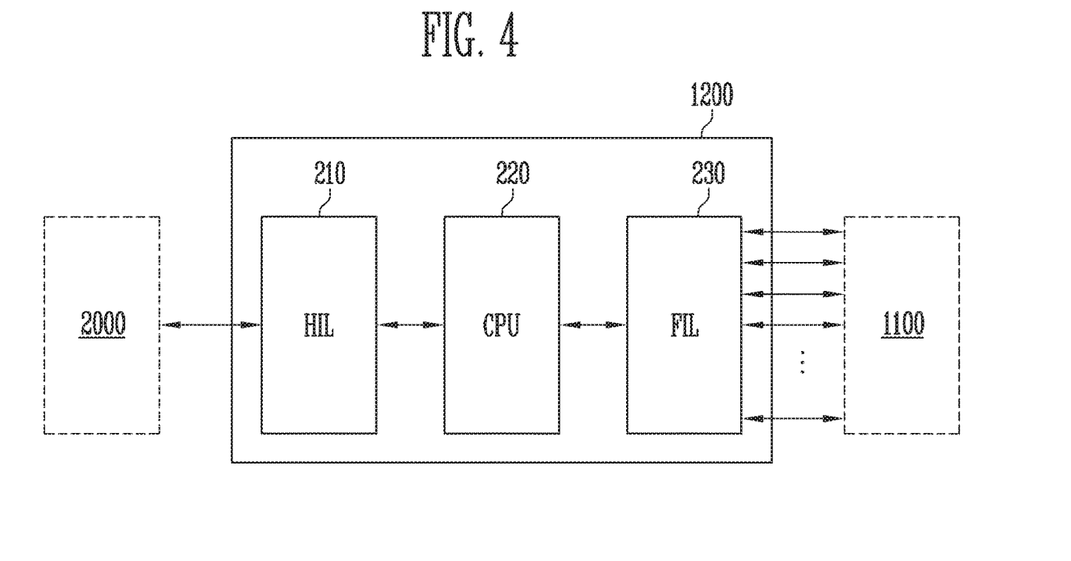
FIG. 4 is a diagram illustrating a controller in accordance with an embodiment of the present disclosure.

FIG. 4 is a diagram illustrating a controller 1200 in accordance with an embodiment of the present disclosure.

Referring to FIG. 4, the controller 1200 may include a host interface layer (HIL) 210, a central processing unit (CPU) 220, and a flash interface layer (FIL) 230.

The HIL 210 may communicate between the host 2000 and the CPU 220. For example, when the HIL 210 receives a request, a logical address, or data from the host 2000, the HIL 210 may transmit the received request, logical address or data to the CPU 220. Also, when the HIL 210 receives data from the CPU 220, the HIL 210 may output the received data to the host 2000.

The CPU 220 may communicate between the HIL 210 and the FIL 230, and control overall operations of the controller 1200. For example, the CPU 220 may convert a request received from the HIL 210 into a command, and transmit the command to the FIL 230 according to states of channels. For example, the CPU 220 may transmit a command to the FIL 230 such that an overload is not applied in a specific channel, by considering commands queued in each channel, peak power, etc. Also, the CPU 220 may convert (or translate) a logical address received from the HIL 210 into a physical address, and transmit the physical address to the FIL 230. The CPU 220 may transmit data received from the HIL 210 to the FIL 230.

The FIL 230 may communicate between the CPU 220 and the memory device 1100. The FIL 230 may receive a command, a physical address, or data from the CPU 220, and transmit the command, the physical address, or the data to dies selected through channels. For example, the FIL 230 may queue commands according to a state of each of the channels, divide program data into a plurality of data groups, and store and update in real time information on a data group including data transmitted to a channel. Also, when the FIL 230 receives a suspend command, the FIL 230 may output the suspend command, when transmission of a currently loaded data group through a channel is ended. When execution of the suspend command is ended, the FIL 230 may resume a stopped (or suspended) program operation. When the program operation is resumed, the FIL 230 may re-transmit a command and a physical address with respect to the stopped program operation, and transmit untransmitted data through the channel.

Figure 5:
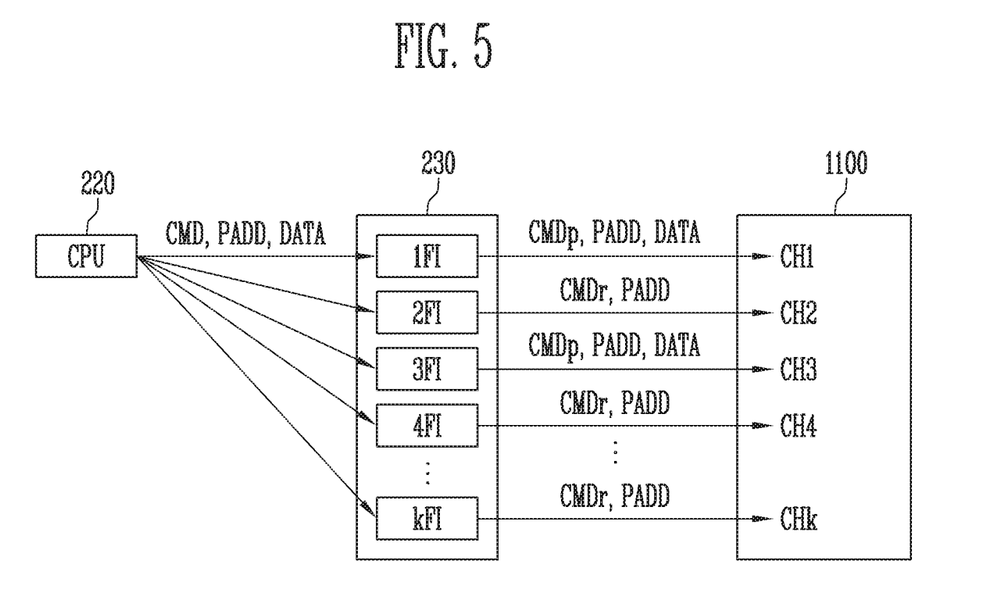
FIG. 5 is a diagram illustrating a configuration of a flash interface layer.

FIG. 5 is a diagram illustrating a configuration of the flash interface layer (FIL) 230.

Referring to FIG. 5, the FIL 230 may include a plurality of flash interfaces 1FI to kFI. The number of the flash interfaces 1FI to kFI may be equal to that of the channels CH1 to CHk communicating with the memory device 1100. For example, when the memory system 1000 is configured in the multi-channel scheme including the first to kth channels CH1 to CHk, the FIL 230 may include first to kth flash interfaces 1FI to kFI. The first flash interface 1FI may communicate with the memory device 1100 through the first channel CH1, the second flash interface 2FI may communicate with the memory device 1100 through the second channel CH2, and the kth flash interface kFI may communicate with the memory device 1100 through the kth channel CHk.

The CPU 220 may selectively transmit a command CMD, a physical address PADD, and data DATA to the first to kth flash interfaces 1FI to kFI according to states of the first to kth channels CH1 to CHk. The CPU 220 may transmit a program command when a program request is received, transmit a read command when a read request is received, and transmit an erase command when an erase request is received.

Each of the first to kth flash interfaces 1FI to kFI may queue the command CMD received from the CPU 220. Further, each of the first to kth flash interfaces 1FI to kFI may transmit a program command CMDp, a physical address PADD, and data DATA to a selected die or transmit a read command CMDr and a physical address PADD to a selected die, though a channel according to a queued order. Each of the first to kth flash interfaces 1FI to kFI may queue various commands received from the CPU 220, in addition to the program command CMDp and the read command CMDr, and output the commands according to a queued order.

For example, the first flash interface 1FI may output the program command CMDp, the physical address PADD, and the data DATA through the first channel CH1, and the kth flash interface kFI may output the read command CMDr and the physical address PADD through the kth channel CHk.

Figure 6:
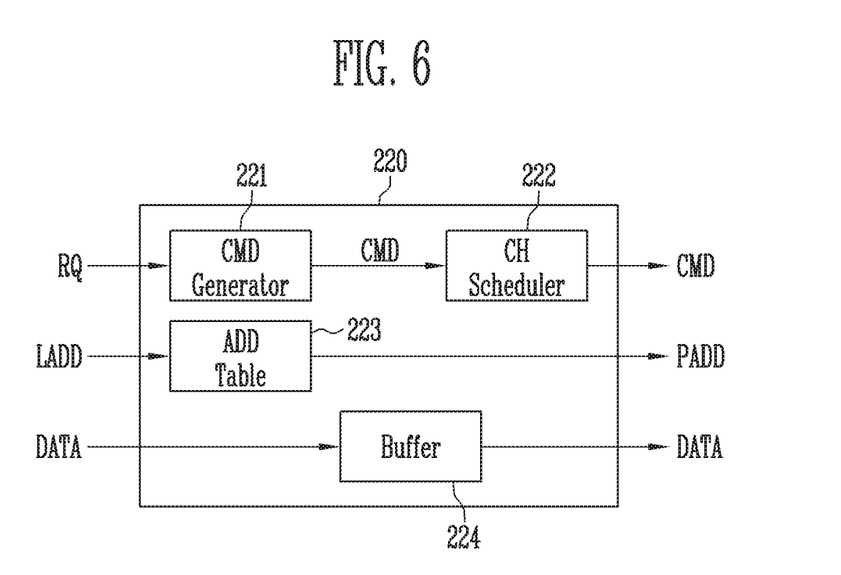
FIG. 6 is a diagram illustrating a central processing unit in accordance with an embodiment of the present disclosure.

FIG. 6 is a diagram illustrating a central processing unit (CPU) 220 in accordance with an embodiment of the present disclosure.

Referring to FIG. 6, the CPU 220 may include a command (CMD) generator 221, a channel (CH) scheduler 222, an address (ADD) table 223, and a first buffer 224.

The command generator 221 may generate a request RQ received from the host 2000 as a command CMD to be used in the memory system 1000, and transmit the generated command CMD to the CH scheduler 222.

The channel scheduler 222 may queue the command CMD received from the command generator 221 according to states of channels, and output the command CMD according to a queued order.

The address table 223 may be a table in which logical addresses LADD and physical addresses PADD are mapped to each other. The address table 223 may be stored in an internal memory, which is included in the CPU 220. The address table 223 may be updated whenever mapped addresses are changed. When a logical address LADD is received, the address table 223 may output a physical address PADD corresponding to the received logic address LADD.

The first buffer 224 may temporarily store data DATA received from the host 2000, and transmit the data DATA to the FIL 230 according to a set data width.

Figure 7:
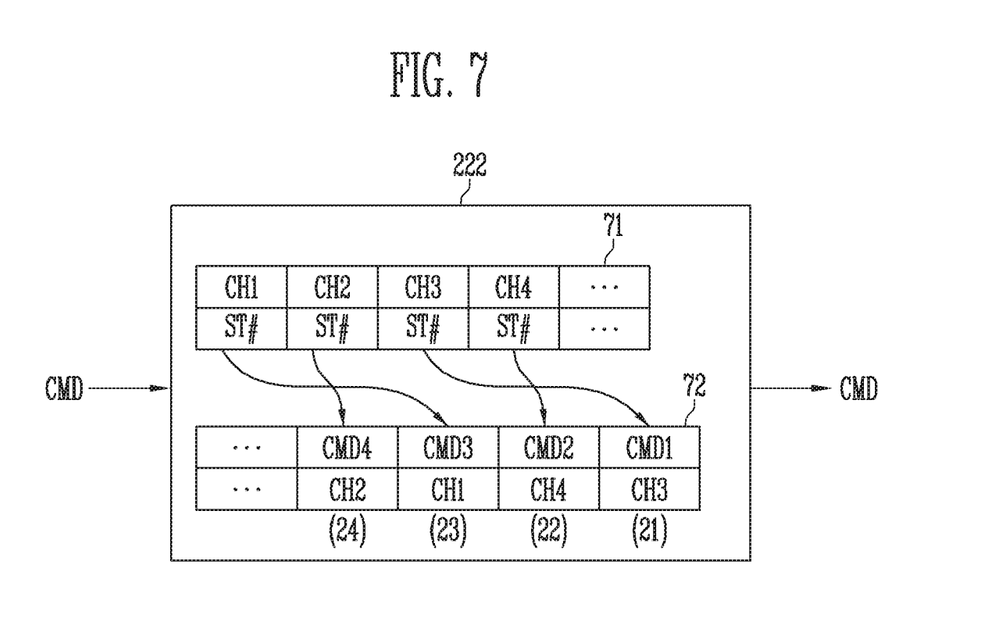
FIG. 7 is a diagram illustrating a function of a channel scheduler.

FIG. 7 is a diagram illustrating a function of the channel (CH) scheduler 222.

Referring to FIG. 7, the channel scheduler 222 may include a second buffer 71 and a third buffer 72. The second buffer 71 is configured to store state information ST # on each of channels CH1, CH2, . . . . The third buffer 72 is configured to temporarily store queued commands CMD according to the state information ST #. For example, the state information ST # in the second buffer 71 may include information on the number of commands CMD being executed or to be executed in each channel, or information on a current power consumption amount or predicted power consumption amount of each channel. Alternatively, the state information ST # may include all the information.

Information on predicted power consumption amount or information on an operation time may be stored in the channel scheduler 222. The channel scheduler 222 may update state information ST # of a corresponding channel in the second buffer 71 according to queuing information of commands stored in the third buffer 72. The state information ST # may be calculated as a workload for each channel to be stored in the second buffer 71.

That is, the channel scheduler 222 may check a workload corresponding to state information ST # of the channels CH1, CH2, . . . , which are stored in the second buffer 71. Further, the CH scheduler 222 may preferentially allocate a command CMD to a channel having a relatively low workload or allocate a command CMD having a relatively high workload to a channel having a relatively low workload. For example, according to workloads of the channels CH1, CH2, . . . and a workload of a received command CMD, the channel scheduler 222 may allocate a first command CMD1 to a third channel CH3 (21), allocate a second command CMD2 to a fourth channel CH4 (22), allocate a third command CMD3 to a first channel CH1 (23), and allocate a fourth command CMD4 to a second channel CH2 (24).

The channel scheduler 222 may sequentially output the first to fourth commands CMD1 to CMD4 according to an order (21, 22, 23, and 24) in which the first to fourth commands CMD1 to CMD4 are queued in the third buffer 72, and update the state information ST # for each channel in the second buffer 71.

Figure 8:
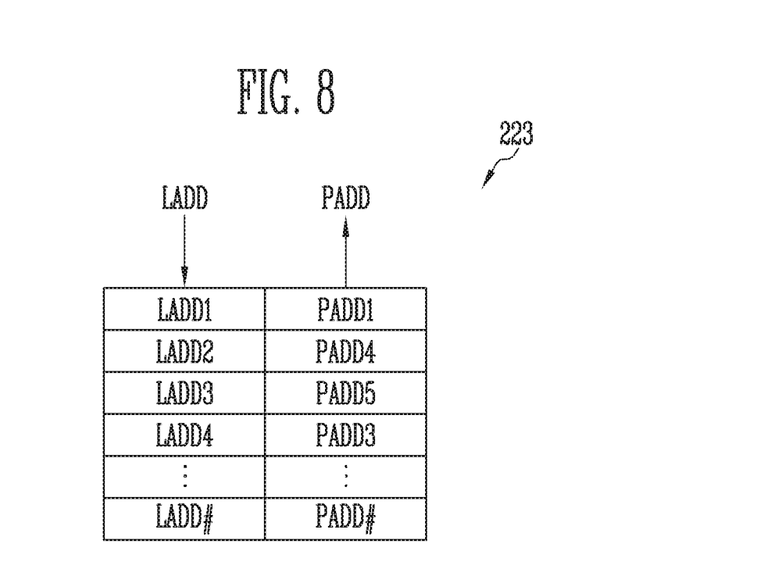
FIG. 8 is a diagram illustrating an address table.

FIG. 8 is a diagram illustrating the address (ADD) table 223.

Referring to FIG. 8, the address table 223 may include physical addresses PADD1 to PADD # respectively mapped to logical addresses LADD1 to LADD #. The logical addresses LADD1 to LADD # may be addresses used in the host 2000, and the physical addresses PADD1 to PADD # may be addresses used in the memory device 1100.

The CPU 220 may update the address table 223 whenever the mapped addresses are changed. When a logical address LADD is received, the CPU 220 may output a physical address PADD mapped to the received logical address LADD.

Figure 9:
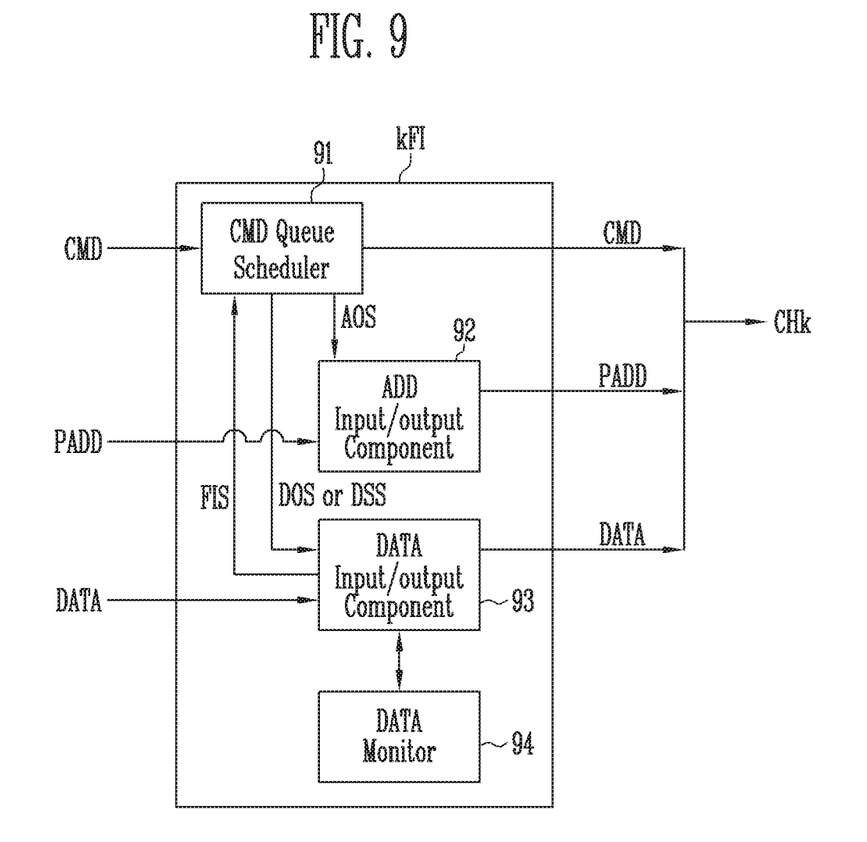
FIG. 9 is a diagram illustrating a flash interface.

FIG. 9 is a diagram illustrating a flash interface.

Referring to FIG. 9, the flash interface is any of the first to kth flash interfaces 1FI to kFI shown in FIG. 5, and the first to kth flash interfaces 1FI to kFI may be configured identically to one another. Therefore, the kth flash interface kFI is described as an example.

The kth flash interface kFI may include a command (CMD) queue scheduler 91, an address (ADD) input/output component 92, a data input/output component 93, and a data monitor 94.

When normal commands CMD are input, each of the components in the kth flash interface kFI may operate as follows.

The command queue scheduler 91 may queue input commands CMD, and sequentially output the queued commands CMD. For example, when normal commands are input, the command queue scheduler 91 may queue the normal commands in an order in which the normal commands are input, and output commands CMD in an order in which the normal commands are queued. Also, after the command queue scheduler 91 outputs a command CMD, the command queue scheduler 91 may sequentially output an address output signal AOS and a data output signal DOS.

When a physical address PADD is input, the address input/output component 92 may temporarily store the input physical address PADD, and output the physical address PADD in response to the address output signal AOS output from the command queue scheduler 91.

When data DATA is input, the data input/output component 93 may temporarily store the input data DATA, and output the data DATA in response to the data output signal DOS output from the command queue scheduler 91.

The data monitor 94 may communicate with the data input/output component 93. The data monitor 94 may divide data input to the data input/output component 93 into a plurality of data groups, and monitor in real time a data group currently output from the data input/output component 93.

When a suspend command CMD is input, each of the components in the kth flash interface kFI may operate as follows.

The command queue scheduler 91 may provide the suspend command with a higher priority than the existing queued normal commands CMD, and output a data output stop signal DSS. Subsequently, when a completion signal FIS output from the data input/output component 93 is received, the command queue scheduler 91 may output the suspend command. The suspend command may be a read command, and therefore, the command queue scheduler 91 may output the suspend command and then output an address output signal AOS.

The address input/output component 92 may temporarily store a physical address PADD input together with the suspend command, and output the physical address PADD in response to an address output signal AOS output from the command queue scheduler 91.

When the data output stop signal DSS is received from the command queue scheduler 91, the data input/output component 93 may output data up to and including last data set by the data monitor 94, and output the completion signal FIS.

The data monitor 94 may store information on a data group including the data output from the data input/output component 93.

When the completion signal FIS is received, the command queue scheduler 91 may output the suspend command.

When a resume command CMD is input, each of the components included in the kth flash interface kFI may operate as follows.

The command queue scheduler 91 may re-output a normal command CMD stopped by the suspend command in response to the resume command. Subsequently, the command queue scheduler 91 may sequentially output an address output signal AOS and a data output signal DOS.

The address input/output component 92 may output a physical address PADD in response to the address output signal AOS output from the command queue scheduler 91.

When the data output signal DOS output from the command queue scheduler 91 is re-input, the data input/output component 93 may output the data that was stopped from being output as a result of the suspend command. Information on the data that was not output may be received from the data monitor 94.

The data monitor 94 may transmit information on a next data group to the data input/output component 93, based on information on a data group that has been completely output in a previous normal operation.

The data input/output component 93 may output data from data of a selected data group according to data group information received from the data monitor 94.

An operation of the command queue scheduler 91, among the above-described components, is additionally described as follows.

Figure 10:
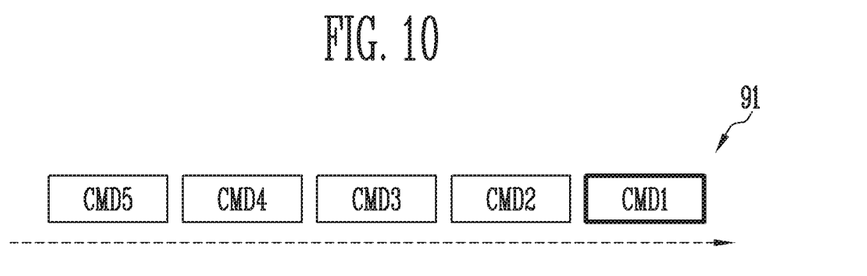
FIGS. 10 to 12 are diagrams illustrating a method in which a command queue scheduler queues a suspend command.
Figure 11:
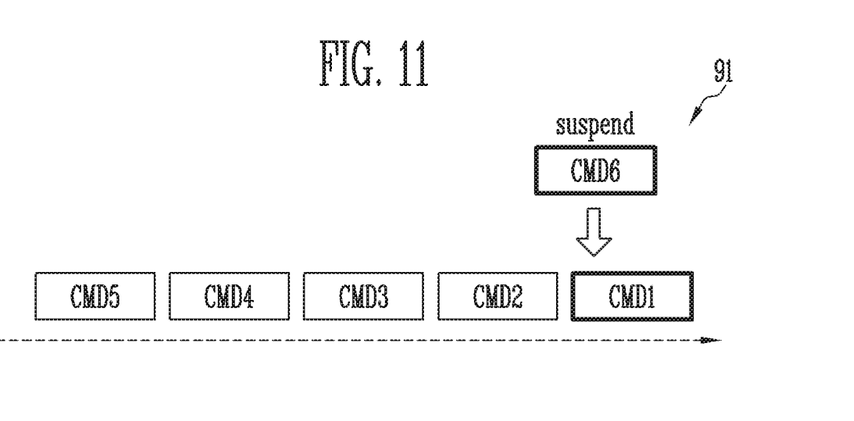
Figure 12:
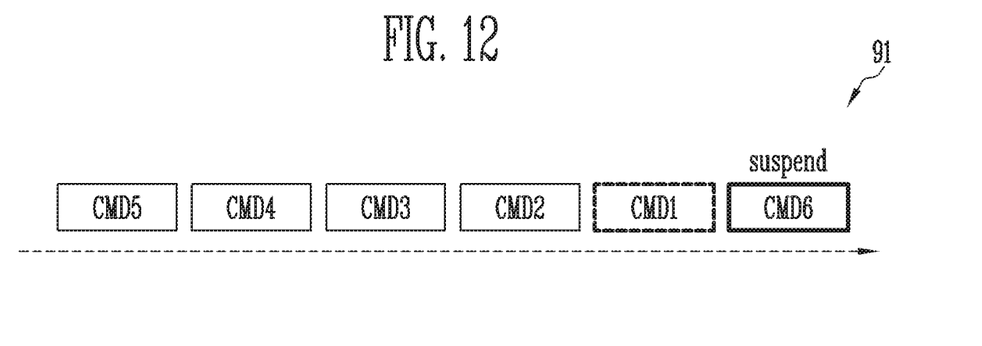

FIGS. 10 to 12 are diagrams illustrating a method in which the command (CMD) queue scheduler 91 queues a suspend command.

Referring to FIG. 10, when first to fifth normal commands CMD1 to CMD5 are sequentially input to the command queue scheduler 91, the command queue scheduler 91 may queue the first to fifth commands CMD1 to CMD5 in an order in which they are input, and sequentially output the first to fifth commands CMD1 to CMD5 in that same order.

Referring to FIG. 11, when a suspend command CMD6 is input before the command queue scheduler 91 outputs the first command CMD1 and then output the second command CMD2 as a next command, an operation corresponding to the first command CMD1 that is being executed may be stopped. To this end, the command queue scheduler 91 may store a command that has most recently been output until all operations corresponding to the commands that have been outputted are completed.

Referring to FIG. 12, the command queue scheduler 91 may provide a higher priority to the suspend command CMD6 with respect to the stopped first command CMD1, and queue the commands such that the suspend command CMD6 is higher in the queue and thus output earlier than the other normal commands CMD1 to CMD5.

Figure 13:
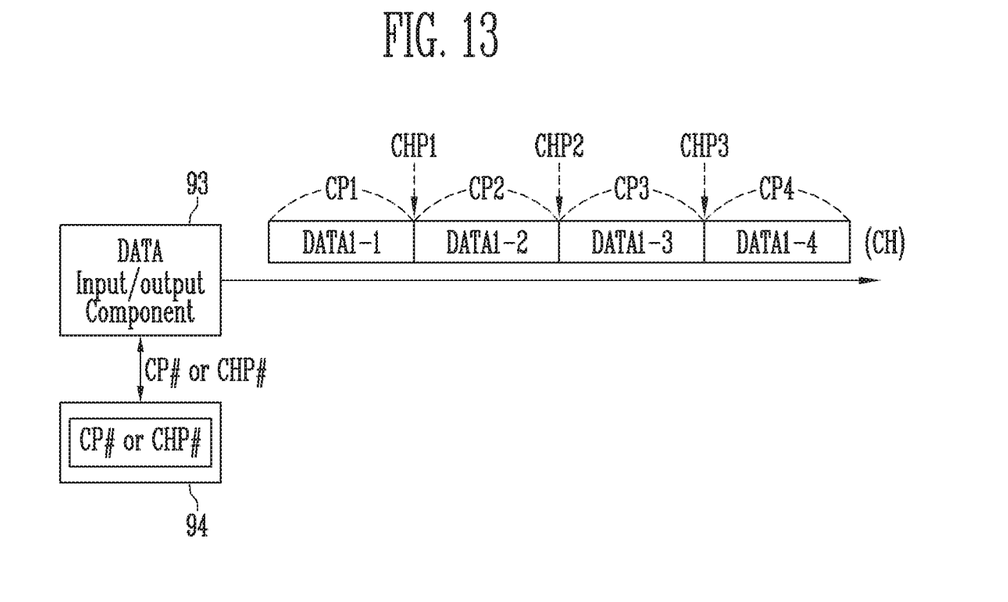
FIG. 13 is a diagram illustrating a data group setting method in accordance with an embodiment of the present disclosure.

FIG. 13 is a diagram illustrating a data group setting method in accordance with an embodiment of the present disclosure.

Referring to FIG. 13, the data monitor 94 may set data groups by dividing data DATA input to the data input/output component 93 into the data groups according to capacities CP1 to CP4 or intervals CHP1 to CHP3.

When data groups DATA1-1 to DATA1-4 are divided according to the capacities CP1 to CP4, the data monitor 94 may divide the total capacity of the data DATA input to the data input/output unit 93 into 4 portions. This division is merely an example; the DATA may be divided into more or less than 4 portions. The capacities CP1 to CP4 may be equal to or different from one another. For example, a first data group DATA1-1 may have a first capacity CP1, a second data group DATA1-2 may have a second capacity CP2, a third data group DATA1-3 may have a third capacity CP3, and a fourth data group DATA1-4 may have a fourth capacity CP4, which capacities may all be the same or one or more may be different. The data monitor 94 may update information on a data group including currently output data, whenever the capacity of data output from the data input/output component 93 reaches a set capacity.

When the data groups DATA1-1 to DATA1-4 are divided according to the intervals CHP1 to CHP3, the data monitor 94 may store the intervals CHP1 to CHP3 for the set times they represent, when the data DATA is output to a channel CH1 from the data input/output component 93. That is, the data monitor 94 may set a time corresponding to each of a plurality of intervals, and update information on a data group including data for every set time after the data is output from the data input/output component 93. For example, position information of data output from the data input/output component 93 may be stored at a first time CHP1 when a certain time elapses after first data is output. Position information of data output from the data input/output component 93 may be stored at a second time CHP2 when a certain time elapses after the first time CHP1. Position information of data output from the data input/output component 93 may be stored at a third time CHP3 when a certain time elapses after the second time CHP2.

Assuming that data currently output from the data input/output component 93 is included in the second data group DATA1-2 when a suspend command is input, the data input/output component 93 may output only that data up to and including the data in the second data group DATA1-2, based on information on a data group including data transmitted to a current channel CH from the data monitor 94, and then stop the output of data in the third data group DATA1-3.

When a program operation that has been stopped is resumed after the suspend command is executed, the data input/output component 93 may receive, from the data monitor 94, information of the third data group DATA1-3 corresponding to a next group of the second data group DATA1-2, of which output has been stopped. The data input/output component 93 may sequentially output data from first data in the third data group DATA1-3 according to information of the third data group DATA1-3.

As described above, in this embodiment, when the suspend command is input, a delay time until the suspend command is executed may be reduced, and a resume time of the program operation stopped by the suspend command may also be reduced. In relation to this, the existing operating method and an operating method in accordance with this embodiment compare as follows.

Figure 14:
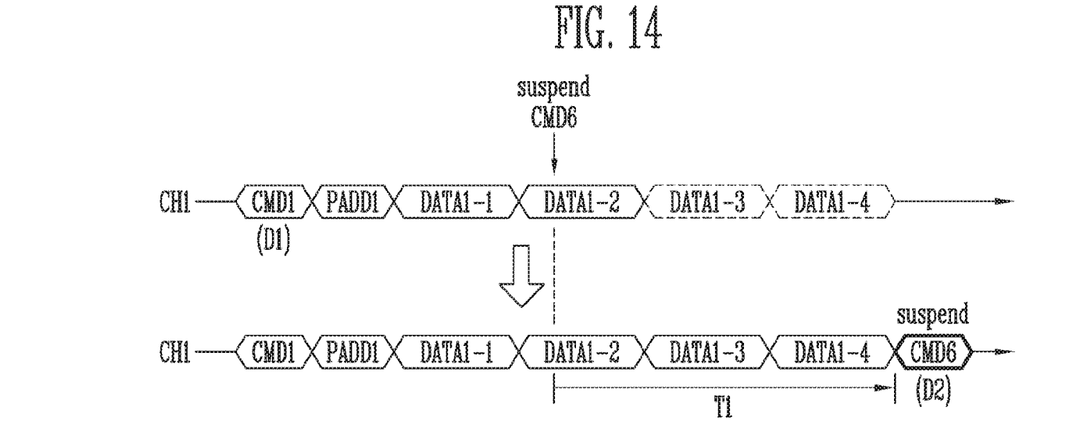
FIG. 14 is a diagram illustrating a general suspend command processing method.

FIG. 14 is a diagram illustrating a general suspend command processing method.

Referring to FIG. 14, assuming that a first command CMD1 is a program command, the program command CMD1, a physical address PADD, and first to fourth data groups DATA1-1 to DATA1-4 may be sequentially input to a first die D1 coupled to a first channel CH1. When data in the second data group DATA1-2 is input to the first die D1, a suspend command CMD6 for a second die D2 may be input. The suspend command CMD6 may be a read command. In a general case, although the suspend command CMD6 is input, the suspend command CMD6 is transmitted after all data DATA1-1 to DATA1-4 related to a program command being currently executed are transmitted. Hence, a first delay time may elapse until the suspend command CMD6 is executed in the second die D2.

Figure 15:
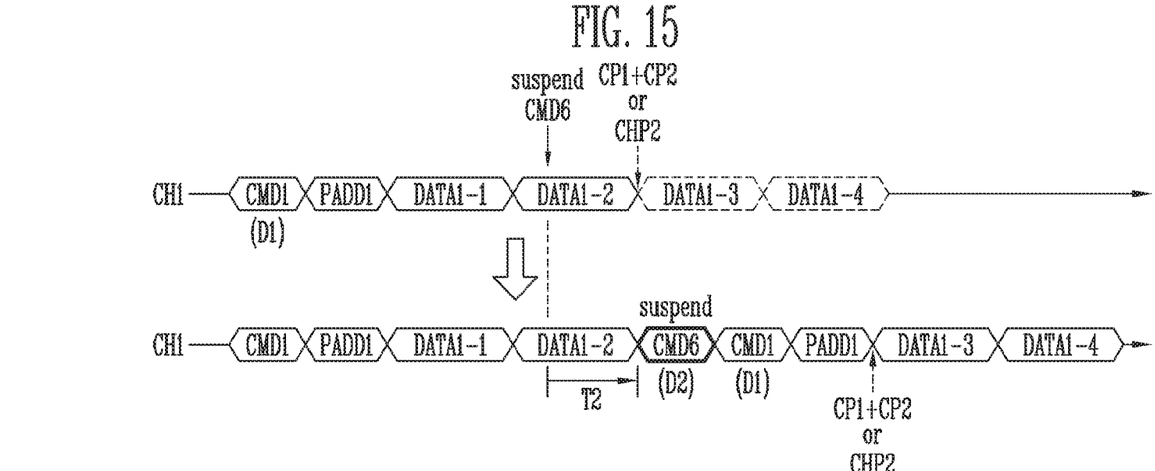
FIG. 15 is a diagram illustrating a suspend command processing method in accordance with an embodiment of the present disclosure.

FIG. 15 is a diagram illustrating a suspend command processing method in accordance with an embodiment of the present disclosure.

Referring to FIG. 15, unlike FIG. 14, when the suspend command CMD6 is input, data is transmitted to the first die D1 including all data up to data in the second data group DATA1-2, which is currently being transmitted through the first channel CH1. Then, the suspend command CMD6 for the second die D2 may be executed before data in the third and fourth data groups DATA1-3 and DATA1-4 are transmitted to the first die D1. That is, in accordance with this embodiment, a second delay time T2 shorter than the first delay time T1 may elapse until the suspend command CMD6 is executed. When the execution of the suspend command CMD6 is completed in the second die D2, data that is not output may be detected based on data capacity information CP1, data interval information CHP2, or information obtained by adding up the data capacity information CP1 and the data interval information CHP2. Accordingly, the program command CMD1, the physical address PADD, and the third and fourth data groups DATA1-3 and DATA1-4 may be sequentially transmitted to the first die D1.

Figure 16:
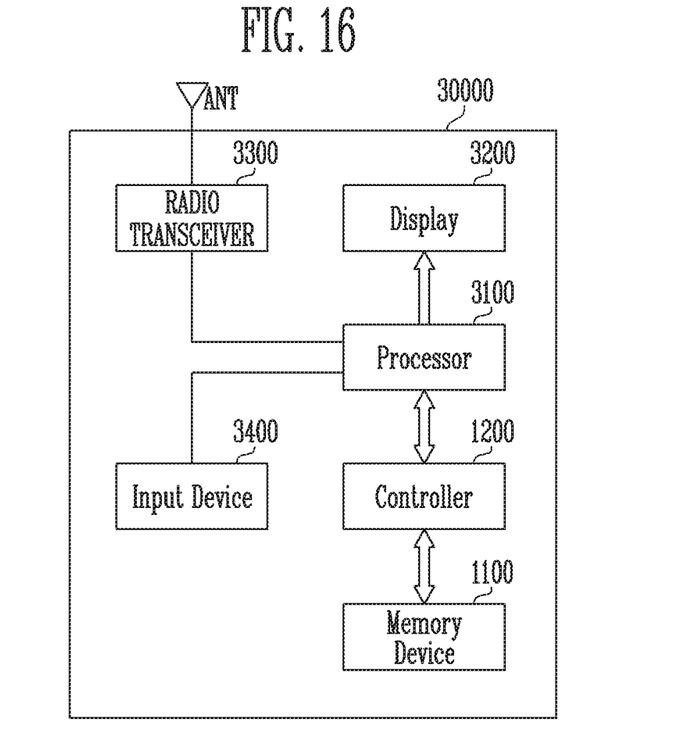
FIG. 16 is a diagram illustrating another embodiment of the memory system including the controller shown in FIG. 1.

FIG. 16 is a diagram illustrating another embodiment of the memory system including the controller shown in FIG. 1.

Referring to FIG. 16, the memory system 30000 may be implemented as a cellular phone, a smart phone, a tablet personal computer (PC), a personal digital assistant (PDA), or a wireless communication device. The memory system 30000 may include a memory device 1100 and a controller 1200 capable of controlling an operation of the memory device 1100. The controller 1200 may control a data access operation of the memory device 1100, e.g., a program operation, an erase operation, a read operation, or the like under the control of a processor 3100.

Data programmed in the memory device 1100 may be output through a display 3200 under the control of the controller 1200.

A radio transceiver 3300 may transmit and receive radio signals through an antenna ANT. For example, the radio transceiver 3300 may convert a radio signal received through the antenna ANT into a signal that can be processed by the processor 3100. Therefore, the processor 3100 may process a signal output from the radio transceiver 3300 and transmit the processed signal to the controller 1200 or the display 3200. The controller 1200 may transmit the signal processed by the processor 3100 to the memory device 1100. Also, the radio transceiver 3300 may convert a signal output from the processor 3100 into a radio signal, and output the changed radio signal to an external device through the antenna ANT. An input device 3400 is a device capable of inputting a control signal for controlling an operation of the processor 3100 or data to be processed by the processor 3100, and may be implemented as a pointing device such as a touch pad or a computer mount, a keypad, or a keyboard. The processor 3100 may control an operation of the display 3200 such that data output from the controller 1200, data output from the radio transceiver 3300, or data output from the input device 3400 can be output through the display 3200.

In some embodiments, the controller 1200 capable of controlling an operation of the memory device 1100 may be implemented as a part of the processor 3100, or be implemented as a chip separate from the processor 3100.

Figure 17:
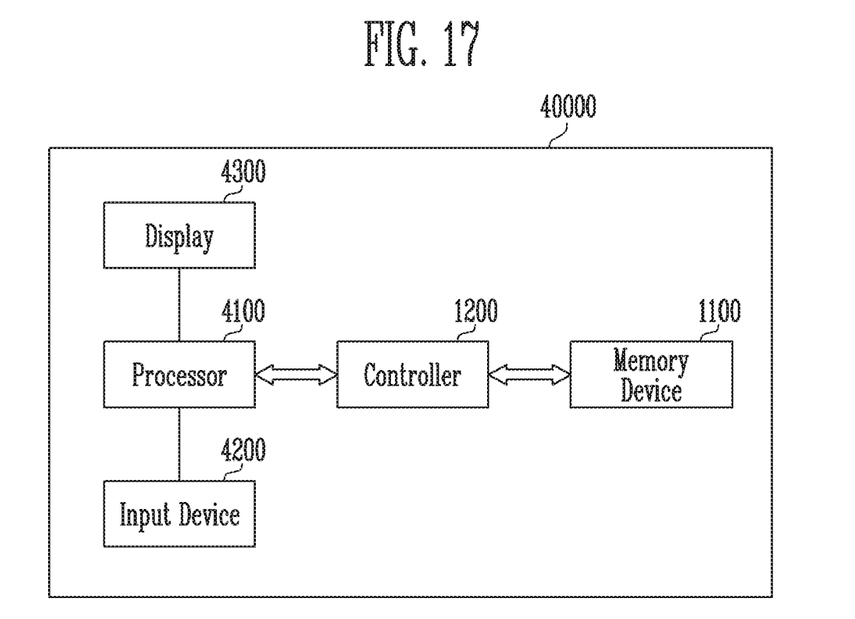
FIG. 17 is a diagram illustrating another embodiment of the memory system including the controller shown in FIG. 1.

FIG. 17 is a diagram illustrating another embodiment of the memory system including the controller shown in FIG. 1.

Referring to FIG. 17, the memory system 40000 may be implemented as a personal computer (PC), a tablet PC, a net-book, an e-reader, a personal digital assistant (PDA), a portable multi-media player (PMP), an MP3 player, or an MP4 player.

The memory system 40000 may include a memory device 1100 configured to store data and a controller 1200 capable of controlling a data processing operation of the memory device 1100.

A processor 4100 may output data stored in the memory device 1100 through a display 4300 according to data input through an input device 4200. For example, the input device 4200 may be implemented as a pointing device such as a touch pad or a computer mouse, a keypad, or a keyboard.

The processor 4100 may control overall operations of the memory system 40000, and control an operation of the controller 1200. In some embodiments, the controller 1200 capable of controlling an operation of the memory device 1100 may be implemented as a part of the processor 4100, or be implemented as a chip separate from the processor 4100.

Figure 18:
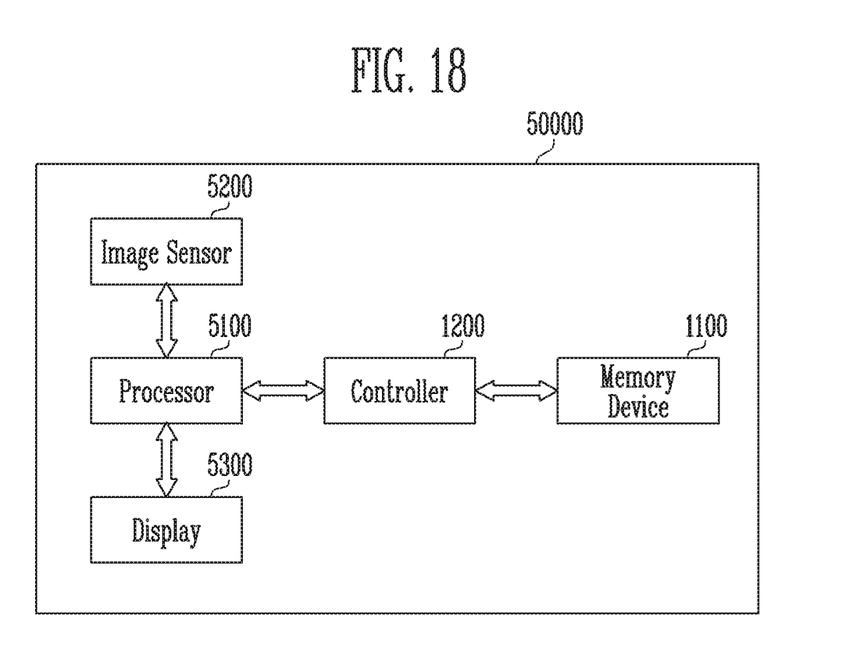
FIG. 18 is a diagram illustrating another embodiment of the memory system including the controller shown in FIG. 1.

FIG. 18 is a diagram illustrating another embodiment of the memory system including the controller shown in FIG. 1.

Referring to FIG. 18, the memory system 50000 may be implemented as an image processing device, e.g., a digital camera, a smart phone having a digital camera attached thereto, or a tablet PC having a digital camera attached thereto.

The memory system 50000 may include a memory device 1100 and a controller 1200 capable of controlling a data processing operation of the memory device 1100, e.g., a program operation, an erase operation, or a read operation.

An image sensor 5200 of the memory system 50000 may convert an optical image into digital signals, and the converted digital signals may be transmitted to a processor 5100 or the controller 1200. Under the control of the processor 5100, the converted digital signals may be output through a display 5300, or be stored in the memory device 1100 through the controller 1200. In addition, data stored in the memory device 1100 may be output through the display 5300 under the control of the processor 5100 or the controller 1200.

In some embodiments, the controller 1200 capable of controlling an operation of the memory device 1100 may be implemented as a part of the processor 5100, or be implemented as a chip separate from the processor 5100.

Figure 19:
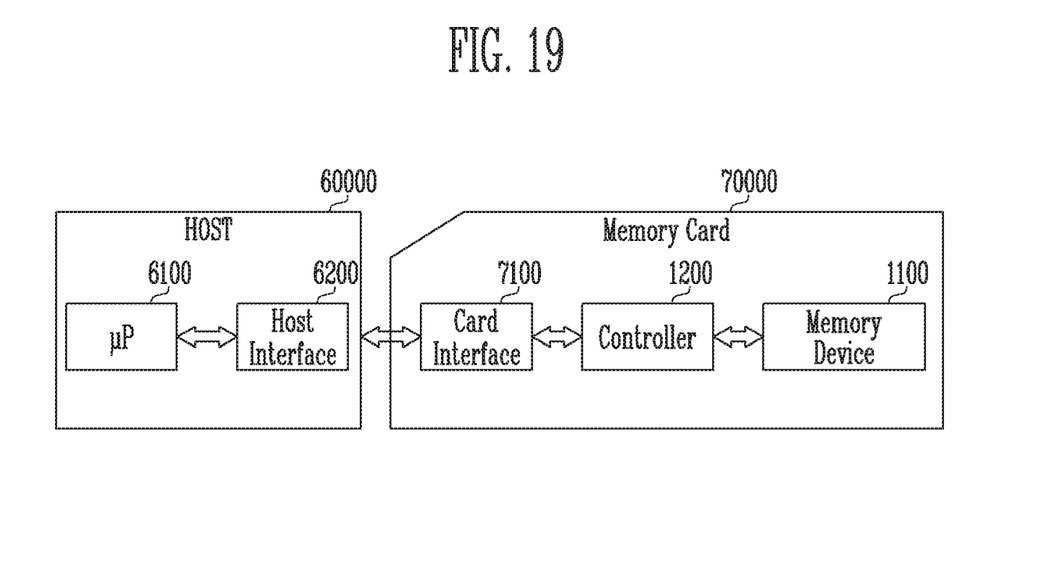
FIG. 19 is a diagram illustrating another embodiment of the memory system including the controller shown in FIG. 1.

FIG. 19 is a diagram illustrating another embodiment of the memory system including the controller shown in FIG. 1.

Referring to FIG. 19, the memory system 70000 may be implemented as a memory card or a smart card. The memory system 70000 may include a memory device 1100, a controller 1200, and a card interface 7100.

The controller 1200 may control data exchange between the memory device 1100 and the card interface 7100. In some embodiments, the card interface 7100 may be a secure digital (SD) card interface or a multi-media card (MMC) interface, but the present disclosure is not limited thereto.

The card interface 7100 may interface data exchange between a host 60000 and the controller 1200 according to a protocol of the host 60000. In some embodiments, the card interface 7100 may support a universal serial bus (USB) protocol and an inter-chip (IC)-USB protocol. The card interface 7100 may mean hardware capable of supporting a protocol used by the host 60000, software embedded in the hardware, or a signal transmission scheme.

When the memory system 70000 is coupled to a host interface 6200 of the host 60000 such as a PC, a tablet PC, a digital camera, a digital audio player, a cellular phone, console video game hardware, or a digital set-top box, the host interface 6200 may perform data communication with the memory device 1100 through the card interface 7100 and the controller 1200 under the control of a microprocessor (μP) 6100.

In accordance with embodiments of the present disclosure, when a suspend command is received during a program operation, the controller transmits data including all data groups currently being transmitted, to the memory device, and executes the suspend command, so that execution delay of the suspend command due to an operation being currently performed may be prevented.

Various embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A controller comprising:
   a command queue scheduler configured to queue normal commands, and provide a suspend command with a higher priority than the normal commands, when the suspend command is input;
   a data input/output component configured to output multiple data items in response to a data output signal from the command queue scheduler, and stop the output of the multiple data items in response to a data output stop signal from the command queue scheduler; and
   a data monitor configured to divide plural items of input data input to the data input/output component into a plurality of data groups, and monitor information of a current data group including data that is currently output from the data input/output component,
   wherein the data input/output component outputs preceding data and the currently output data in the current data group and stops the output of next data, in response to the data output stop signal,
   wherein the command queue scheduler outputs the suspend command, when the output of the current data group is stopped.

2. The controller of claim 1, wherein the command queue scheduler sequentially outputs the normal commands according to an order in which the normal commands are queued, and stores an output normal command until execution of the output normal command is completed.

3. The controller of claim 2, wherein the command queue scheduler:
   when the suspend command is executed, outputs the suspend command by providing a higher priority to the suspend command than a suspended normal command output prior to the suspend command; and
   when a resume command is input, re-outputs the suspended normal command execution of which has been stopped due to the suspend command.

4. The controller of claim 1, wherein the command queue scheduler:
   outputs the data output stop signal to the data input/output component, when the suspend command is input; and
   outputs the suspend command, when a completion signal is received from the data input/output component.

5. The controller of claim 4, wherein, when the data output stop signal is received, the data input/output component receives information on the current data group from the data monitor, and outputs all data in the received current data group and then outputs the completion signal.

6. The controller of claim 1, wherein, when the data input/output component re-receives the data output signal from the command queue scheduler, the data input/output component outputs data in a next data group of the data group that has been completely output.

7. The controller of claim 1, wherein the data monitor manages information on the data groups by dividing the plural items of input data according to capacities or output intervals.

8. The controller of claim 7, wherein, when the plural items of input data are divided according to capacities, the data monitor:
    defines the plurality of data groups by dividing the plural items of input data to the data input/output component according to a set capacity; and
    updates information on the current data group including the currently output data, whenever the capacity of data output from the data input/output component reaches the set capacity.

9. The controller of claim 7, wherein, when the plural items of input data is divided according to output intervals, the data monitor sets a time corresponding to a plurality of intervals, and updates information on the current data group including the current output data every set time after data is output from the data input/output component.

10. A memory system comprising:
    first and second dies coupled to the same channel;
    a processor configured to output a first command or a second command having a higher priority than that of the first command, in response to a request received from a host; and
    a flash interface layer configured to output data to the first die in response to the first command,
    wherein the flash interface layer:
    divides input data into a plurality of data groups;
    when the second command is input, outputs preceding data and currently output data in a current data group and then outputs the second command to the second die; and
    when execution of the second command ends, outputs, to the first die, data in a next data group of the current data group that has been completely output.

11. The memory system of claim 10, wherein the processor includes:
    a command generator configured to convert the request into the first command or the second command;
    a channel scheduler configured to output the first command or the second command to the flash interface layer, based on state information of the channel;
    an address table configured to output a physical address correspond to a logical address received from the host to the flash interface layer; and
    a first buffer configured to temporarily store the data received from the host and then output the data to the flash interface layer.

12. The memory system of claim 11, wherein the channel scheduler includes:
    a second buffer configured to store and update the state information; and
    a third buffer configured to temporarily store commands queue through the channel.

13. The memory system of claim 12, wherein the state information includes workload information of the channel.

14. The memory system of claim 10, wherein the flash interface layer includes:
    a command queue scheduler configured to temporarily store the first command or the second command, and queue the first and second commands such that execution of the first command is stopped and the second command is executed, when the second command is input while the first command is being executed;
    an address input/output component configured to temporarily store the physical address received from the processor, and output the physical address in response to an address output signal output from the command queue scheduler;
    a data input/output component configured to output the data in response to a data output signal output from the command queue scheduler, and stop the output of the data in response to a data output stop signal; and
    a data monitor configured to divide the input data into the plurality of data groups, and monitor information of the current data group from the data input/output component.

15. The memory system of claim 14, wherein the data input/output component outputs preceding data and the currently output data in the current data group and then stops the output of next data, in the data output stop signal,
    wherein the command queue scheduler outputs the suspend command, when the output of the current data group is stopped.

16. The memory system of claim 14, wherein the command queue scheduler:
    when the second command is executed, outputs the second command by providing a higher priority to the second command than the first command output prior to the second command; and
    when a resume command is input, re-outputs the first command that has been stopped due to the second command.

17. The memory system of claim 14, wherein the command queue scheduler:
    outputs the data output stop signal to the data input/output component, when the second command is input; and
    outputs the second command, when a completion signal is received from the data input/output component.

18. The memory system of claim 17, wherein, when the data output stop signal is received, the data input/output component receives information on the current data group from the data monitor, and outputs all data in the received current data group and then outputs the completion signal.

19. The memory system of claim 17, wherein, when the data input/output component re-receives the data output signal from the command queue scheduler, the data input/output component outputs data from data in a next data group of the current data group that has been completely output.

20. The memory system of claim 14, wherein the data monitor manages information on the plurality of data groups by dividing the input data according to capacities or output intervals.

21. A memory system comprising:
    first and second dies; and
    a controller including:
        a processor suitable for receiving a request from a host, and generating a first command for a first die and a second command for a second die, the second command having a higher priority than that of the first command, in response to the request; and a flash interface layer coupled to the first and second dies through a channel, and suitable for receiving a plurality of data groups corresponding to the first command, each of the plurality of data groups including plural data items, providing some data groups among the plurality of data groups to the first die, suspending providing remaining data groups among the plurality of data groups to the first die when the second command is received, and providing the remaining data groups to the first die when the second command is executed.

* * * * *